No. 860,121. PATENTED JULY 16, 1907.
C. W. BLACKBURN.
WHIFFLETREE HOOK.
APPLICATION FILED OCT. 20, 1906.
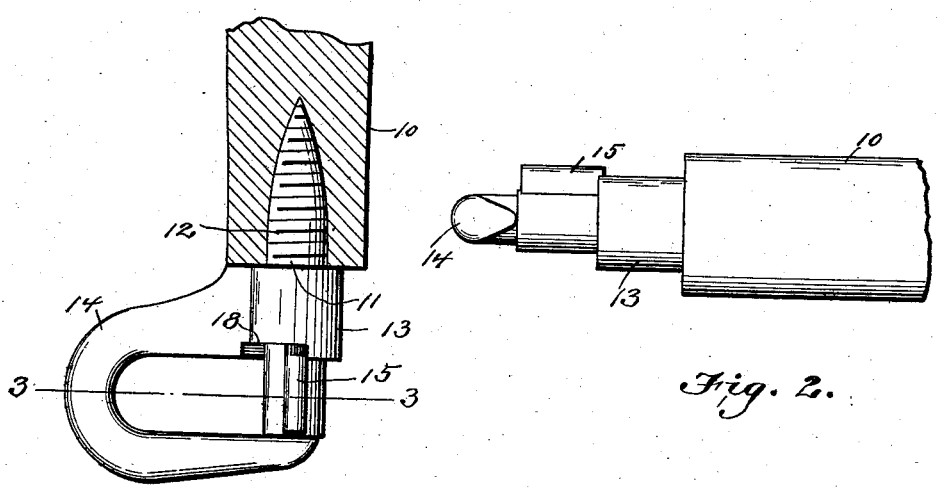
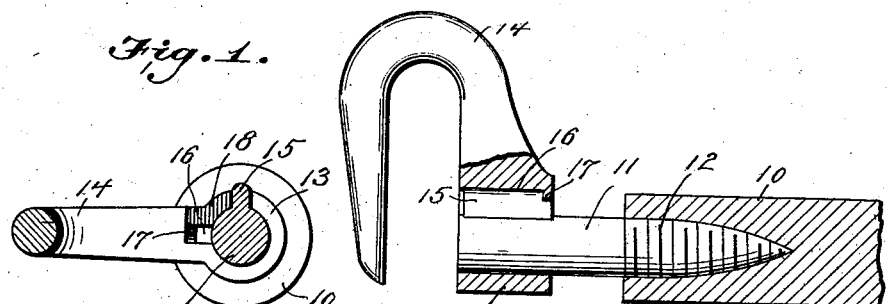
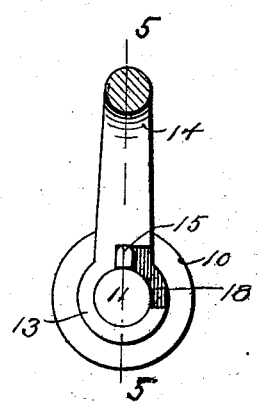
Charles W. Blackburn,
Inventor
Witnesses
Arthur Wesley
M. A. Schmidt
By Milo B. Stevens & Co.
Attorneys
THE NORRIS PETERS CO., WASHINGTON, D. C.

UNITED STATES PATENT OFFICE.

CHARLES W. BLACKBURN, OF BISBEE, ARIZONA TERRITORY.

WHIFFLETREE-HOOK.

No. 860,121.  Specification of Letters Patent.  Patented July 16, 1907.

Application filed October 20, 1906. Serial No. 339,820.

*To all whom it may concern:*

Be it known that I, CHARLES W. BLACKBURN, a citizen of the United States, residing at Bisbee, in the county of Cochise and Territory of Arizona, have invented new and useful Improvements in Whiffletree-Hooks, of which the following is a specification.

This invention is a whiffletree hook, and has for its object to provide means for locking or closing the hook to prevent accidental disengagement of the traces.

A further object is to provide a hook constructed so that the traces can be readily attached or detached.

In the accompanying drawing, Figure 1 is a plan view of the invention. Fig. 2 is a rear elevation. Fig. 3 is a section on the line 3—3 of Fig. 1. Fig. 4 is a similar section showing the parts in another position. Fig. 5 is a section on the line 5—5 of Fig. 4.

Referring specifically to the drawing, 10 denotes one of the ends of an ordinary whiffletree into which is screwed a stem 11 provided with threads 12 for that purpose. The stem projects from the end of the whiffletree, and on said projecting end is rotatably and slidably mounted a sleeve 13 having a forwardly extending hook 14, said hook being formed integral with the sleeve. The projecting end of the stem is without threads, and at its extremity is a key or feather 15 adapted to enter a key-way 16 in the bore of the sleeve. The key-way has a shoulder 17 formed therein which, when engaged by the inner end of the feather as shown in Fig. 5 acts as a stop and prevents the sleeve from being pulled off the stem. The outer end of the sleeve has a notch 18 which extends from the bore of the sleeve and receives the inner end of the feather. The notch limits the swing of the sleeve on the stem by engagement of the feather with its opposite ends.

The hook is locked by sliding the sleeve 13 inwardly on the stem 11 until the outer end of the latter touches the end of the hook as shown in Fig. 1 thus forming a closure for the hook. This brings the feather 15 outside the sleeve with the exception of that portion which extends into the notch 18. The hook is now turned to throw the feather out of alinement with the key-way 16 whereby the sleeve is locked against longitudinal movement on the stem.

To remove the traces the hook is swung upwardly as shown in Fig. 4 to bring the feather in line with the key-way, after which the sleeve can be pulled outwardly on the stem as shown in Fig. 5 which withdraws the end of the stem from the end of the hook and opens the latter to permit removal of the traces. The shoulder 17 as already stated acts as a stop to prevent the sleeve from being pulled off the stem. Fig. 5 also shows the position of the hook when the traces are placed therein, after which the hook is locked as already described.

I claim:—

The combination with a whiffletree, of a stem extending from one end thereof, and provided at its outer end with a feather, a rotatable sleeve on the stem having a key-way to receive the feather and slidable behind the feather between the inner end thereof and the outer end of the whiffletree, said sleeve having a stop-notch in its outer end to receive a portion of the key for limiting the rotation of the sleeve, and a stop in the key-way engageable by the rear end of the feather to limit the forward sliding movement of the sleeve.

In testimony whereof I have signed my name to this specification in the presence of two subscribing witnesses.

CHARLES W. BLACKBURN.

Witnesses:
 JOHN W. ROSS,
 SAMUEL BOWERS.